Jan. 2, 1968     F. A. SATTLER ETAL     3,361,593
POLYESTERAMIDE WIRE ENAMELS AND CONDUCTORS INSULATED THEREWITH
Filed Oct. 1, 1962

WITNESSES

INVENTORS
Frank A. Sattler &
Floyd F. Trunzo
BY
ATTORNEY

United States Patent Office 3,361,593
Patented Jan. 2, 1968

3,361,593
POLYESTERAMIDE WIRE ENAMELS AND CONDUCTORS INSULATED THEREWITH
Frank A. Sattler and Floyd F. Trunzo, Monroeville, Pa., assignors to Westinghouse Electric Corporation, Pittsburgh, Pa., a corporation of Pennsylvania
Filed Oct. 1, 1962, Ser. No. 227,490
17 Claims. (Cl. 117—218)

ABSTRACT OF THE DISCLOSURE

Homopolymer, block copolymer and modified block copolymer polyesteramide resins, suitable for insulating electrical conductors, are prepared from (a) an acid component of isophthalic acid and/or lower dialkylesters of isophthalic or terephthalic acid, (b) a polyol having three or more hydroxyl groups, (c) a dihydric alcohol and (d) urea, and/or aliphatic and aromatic primary and secondary diamines. Certain specified proportions of reactants must be maintained. The polyesteramide may be blended with certain polyesters or the cyclic trimer of tolylene diisocyanate to provide additional wire enameling compositions.

This invention relates to thermosettable copolymeric resin compositions and to electrical conductors insulated therewith. More specifically, this invention is directed to an improved wire coating composition comprising polyesteramides in a suitable solvent, a method of preparing the polyesteramides, and to magnet wire insulated with a thin coating derived from the novel wire enamel.

The requirements imposed on enamel wire coatings are severe and critical. The resinous material employed must produce a coating with very high physical, chemical and electrical properties. Electrical coils are often wound from enameled wire under considerable pressure and at high speeds. The coating must withstand the abrasion, bending stresses and heavy unit pressures without disrupting from the wire or cracking.

Wound coils are impregnated by dipping in hot varnishes containing one or more of a variety of organic solvents, are baked or cured at temperatures as high as 150° C. and are usually exposed to air during baking. Satisfactory coatings must be resistant to the hot varnish and must withstand the high baking temperatures without deteriorating. Additionally, the applied and cured coating must be resistant to the action of oils, greases, water, grit and dust frequently encountered in the environmental atmospheres to which electrical apparatus is exposed.

A resin composition satisfactory for providing an insulating coating on wires must also be capable of being dissolved in commercially available solvents to produce wire enamel solutions having a relatively high resin solids content without excessive viscosity. The resinous compositions should exhibit stability in storage for long periods of time so that marked changes in properties or precipitation of solids does not occur. When applied to wire or other conductors, the resinous composition must be capable of being satisfactorily cured within a reasonably wide range of temperatures. The applied cured coating of resin should be smooth and free from pin holes or other flaws. Furthermore, a thin coating of the cured resinous composition should possess a high dielectric strength and have other desirable electrical insulating properties.

Detailed tests have, in the course of years, been developed for enameled or resin insulated wires to determine their suitability for various applications and as a means of comparing the relative qualities of wires insulated with various resinous coatings. Included are standard tests for flexibility, scrape hardness, repeated abrasion, heat shock, resistance to boiling toluene and thermal stability or thermal life.

Scrape hardness and repeated abrasion tests indicate the ability of the resinous coating to withstand the severe mechanical abuse to which the wire is subjected during winding and in service. Heat shock tests measure the ability of the resinous coating to withstand rapid heating cycles, as for example, those encountered in varnish impregnation of wound coils. The resistance to boiling toluene test measures the ability of the enamel coating to withstand the attack of hot solvents which the coating encounters in varnish impregnation processes. Thermal stability or thermal life tests determine the ability of resinous insulating coatings to withstand elevated environmental temperatures without degradation.

Polyester resins based on terephthalic and isophthalic acids, and esters thereof, reacted with polyols such as glycerol and ethylene glycol have been extensively employed as wire coating materials. Such coatings have excellent thermal stability and good mechanical properties when applied to electrical conductors as insulation. However, improvement in heat shock resistance, solvent resistance, scrape hardness and abrasion resistance would be advantageous.

Accordingly, it is a general object of this invention to provide resinous coating compositions which, when applied to a conductor and cured thereon, exhibit an improvement in heat shock and scrape hardness, abrasion and solvent resistance.

A more specific object of this invention is to provide a polyesteramide coating composition and blends thereof which may be employed as conductor insulation with significant improvements in heat shock and scrape hardness, abrasion and solvent resistance.

Another object of the present invention is to provide an insulated conductor, comprising, in combination, an electrical conductor and solid resinous insulation applied thereto, the resinous insulation comprising a polyesteramide polymer.

Yet another object of the present invention is to provide an insulated conductor comprising, in combination, an electrical conductor and solid resinous insulation applied thereto, the resinous insulation comprising a first coating of a polyesteramide polymer and a second coating deposited over said first coating, the second coating being a linear terephthalate polyester, an aromatic imide, an aromatic amide-imide or a urea-formaldehyde modified epoxy thereby providing a resinous insulation with particular advantageous properties for each composite insulation as compared to a singular resinous insulation.

A further object of the present invention is to provide a novel process for preparing polyesteramide wire enamel compositions.

Other objects of this invention will, in part, be obvious and will, in part, appear hereinafter.

Briefly, the present invention accomplishes the above-cited objects by providing novel polyesteramide wire enamel compositions, and blends thereof, derived from various reactions of dicarboxylic acids and/or esters together with an alcohol and an amine. The particular reactants and the proportions which must be employed according to this invention are described in detail hereinbelow. In addition to the enamel compositions, the coatings resulting from the cure of these compositions and conductors insulated with such coatings are contemplated as within the scope of this invention.

For a more complete understanding of the present invention, reference is made to the following description taken in conjunction with the accompanying drawing wherein.

Figure 1:
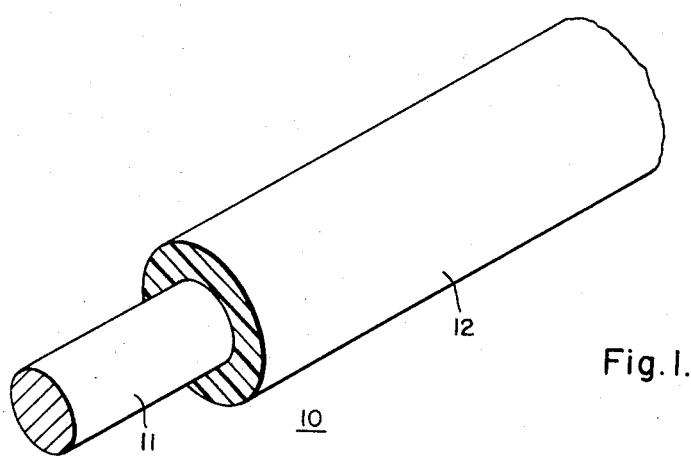
FIG. 1 is a fragmentary isometric view of a conductor provided with an enamel coating of this invention.

We have discovered that certain liquid resinous compositions may be employed to provide insulating coatings having outstanding physical and electrical properties, particularly for the preparation of resin insulated or enameled wire and similar insulated conductors. The deposited solidified resinous coating, a polyesteramide polymer, may be derived from certain homopolymers, block copolymers of polyesters of different functionality with polyamides, blends of polymer solutions or combinations thereof.

Suitable liquid polyesteramide resinous coating materials may be prepared from (a) from 40 to 46 equivalent percent of at least one acidic compound selected from the group consisting of isophthalic acid and the lower dialkyl esters of isophthalic and terephthalic acids; lower dialkyl esters will be understood to include all dialkyls such as dimethyl, diethyl, dipropyl, dibutyl and mixtures thereof, (b) from 13 to 59 equivalent percent of at least one alcohol having three or more hydroxyl groups; examples thereof are glycerol, trimethylolethane, trimethylolpropane and pentaerythritol, (c) up to 43 equivalent percent of at least one dihydric alcohol; examples thereof are ethylene glycol, 1,4-butanediol, neopentyl glycol, 1,5-pentanediol, 1,6-cyclohexanedimethanol, 2,2,4,4 - tetramethyl-1,3-cyclobutanediol and propylene glycol, (d) from 0.85 to 19 equivalent percent of at least one compound selected from the group consisting of urea and aliphatic and aromatic primary and secondary diamines; examples of suitable diamines are ethylenediamine, m-phenylenediamine, methylenedianiline, m-xylylenediamine, piperazine and hexamethylenediamine.

The term "equivalent percent" as employed herein above is calculated according to the following formula:

$$\text{Equivalent percent of ingredient} = \frac{\text{Number of moles of ingredient} \times \text{functionality of ingredient}}{\Sigma (\text{number of moles of ingredient} \times \text{functionality of ingredient})}$$

It should be understood that the functional groups in the foregoing reactants are the carboxyl, hydroxyl and amino groups. Therefore, the dicarboxylic acidic compounds, the dihydric alcohol, the urea or the diamine will be bifunctional while the functionality of the alcohol having three or more hydroxyl groups will be equal to the particular number of hydroxyl groups in that compound. Only the reactants (a), (b), (c) and (d) outlined hereinabove are employed in determining the equivalent percentages and the denominator in the formula is the sum of the number of moles multiplied by the functionality for these reactants.

As will be more apparent in the example herein below, a catalyst suitable for use in esterifying the acids and alcohols in certain preparations of the liquid polyesteramide coating composition, may comprise at least one metal salt of organic acids selected from the group consisting of saturated and unsaturated aliphatic acids, cyclic acids and aromatic acids. The esterification catalyst is required when the terephthalates are employed as the acidic component but not when isophthalic acid or the isophthalates are employed. Examples of suitable catalysts include linoleates, resonates, naphthenates, acetates, benzoates, octoates, tallates, stearates and acetylacetonates of metals including aluminum, calcium, caesium, chromium, cobalt, copper, iron, lead, manganese, nickel, tin, titanium, vanadium, zinc and zirconium. Two or more metal salts may be employed jointly as an esterification catalyst.

A metal catalyst, separate and distinct from the hereinabove described esterification catalyst, is added, with advantage, to the liquid resinous polyesteramide coating composition or a blend thereof. From 0.1% to about 5% by weight based on the resin solids of at least one metal, selected from the group consisting of nickel, cobalt and zinc, in the form of a metal salt selected from the group consisting of naphthenates, octoates, acetylacetonates and tallates, dissolved in a suitable hydrocarbon solvent may be added to the liquid polyesteramide coating composition before the composition is applied to conductors.

The following examples are illustrative of the preparation of the liquid polyesteramide coating compositions and the application of the compositions to electrical conductors as insulation:

Example I

PART A.—AMIDE COMPONENT

|  | Grams | Moles | Equivalent Percent |
|---|---|---|---|
| Isophthalic Acid | 93.1 | 0.561 | 11.50 |
| 1,4-butanediol | 12.6 | 0.140 | 2.87 |
| Ethylenediamine | 25.3 | 0.421 | 8.64 |

The foregoing ingredients are charged into a 500 ml., 3 neck flask equipped with stirrer, thermometer, nitrogen sparge tube and 6-inch air condenser together with 42.2 grams of m,p-cresol. The entire charge is heated to 250° C. at a rate of about 20° C. per hour. Heating is continued at 250° C. until a thread-forming stage is reached. The product is diluted with 98.2 grams of m,p-cresol and saved from reaction with Part B.

PART B.—POLYESTER COMPONENT

|  | Grams | Moles | Equivalent Percent |
|---|---|---|---|
| Dimethylterephthalate | 291.0 | 1.5 | 30.75 |
| Glycerol | 138.0 | 1.5 | 46.24 |

The ingredients noted as Part B are charged into a one liter, 3-neck flask, equipped with stirrer, thermometer, nitrogen sparge tube and condensate trap together with 0.375 gram of lead acetate and 75 ml, m,p-cresol. The charge is heated rapidly to 180° C., from 180° C. to 215° C. at a rate of about 10° C. per hour. After two hours at 215° C., the resin becomes viscous and thread-forming (90° C., ASTM Ball and Ring Softening Temperature). Seventy-five millimeters of m,p-cresol is added and the reaction is continued at 215° C. for 1 hour to a second thread-forming stage (67.5° C. Ball and Ring Temperature). An additional 75 ml. of cresol is added and the reaction is continued at 215° C. to a third thread-forming stage (58° C. Ball and Ring Temperature). The amide component, the product of Part A hereinabove, is added and the reaction is continued at 212° C. to a fourth thread-forming stage (61.5° C. Ball and Ring Temperature), 300 ml. of m,p-cresol and 400 ml. of xylene being added at this point. Then, 7.4 grams of cobalt naphthenate (6% cobalt) is added. The enamel is thinned to coating viscosity with 3 volumes of xylene to 1 volume of m,p-cresol and coated on No. 17 A.W.G. wire. Standard wire tests disclose that the coated wire of this invention has excellent properties and an improvement in scrape hardness, abrasion resistance and heat shock resistance is noted when compared with the properties of polyester resin coated wires.

Example II

PART A.—AMIDE COMPONENT

|  | Grams | Moles | Equivalent Percent |
|---|---|---|---|
| Isophthalic Acid | 7.25 | .0437 | 1.140 |
| 1,4-butanediol | 0.98 | .0109 | 0.285 |
| Ethylenediamine | 1.97 | .0328 | 0.855 |

PART B.—POLYESTER COMPONENT

|  | Grams | Moles | Equivalent Percent |
|---|---|---|---|
| Dimethylterephthalate | 291 | 1.5 | 39.10 |
| Glycerol | 138 | 1.5 | 58.60 |

The procedure of Example I is followed employing a smaller amount of the Amide Component, as outlined hereinabove. Even this very small addition of ethylenediamine provides a liquid coating composition with an improved baking range and a coated wire with improved flexibility and scrape hardness when compared to polyester wire-coating compositions and wires insulated therewith.

Example III

PART A.—AMIDE COMPONENT

|  | Equivalent Percent | Grams | Moles |
|---|---|---|---|
| Isophthalic Acid | 11.50 | 93.1 | 0.561 |
| 1,4-butanediol | 2.87 | 12.6 | 0.140 |
| Ethylenediamine | 8.64 | 25.3 | 0.421 |

PART B.—POLYESTER COMPONENT

|  |  | Grams | Moles |
|---|---|---|---|
| Isophthalic Acid | 30.75 | 291.0 | 1.5 |
| Glycerol | 46.24 | 138.0 | 1.5 |

In this example, the dimethylterephthalate of Part B, Example I, is replaced by isophthalic acid, as will be apparent from the table hereinabove, the reaction being carried out as outlined hereinabove in Example I. Satisfactory properties are noted with an improvement in flexibility and a decrease in heat shock resistance when compared to terephthalate polyesteramide coated wires. The thermal stability of wire specimens coated with this resin appears to be only fair. However, very good thermal stability is obtained when test specimens are varnished with a silicone impregnant.

Example IV

PART A.—AMIDE COMPONENT

|  | Grams | Moles | Equivalent Percent |
|---|---|---|---|
| Isophthalic Acid | 133.0 | 0.8 | 17.38 |
| 1,4-butanediol | 18.0 | 0.2 | 4.35 |
| Ethylenediamine | 36.1 | 0.6 | 13.05 |

The foregoing ingredients are charged into a 500 ml. 3-neck flask, equipped with stirrer, thermometer, nitrogen sparge tube and a 6-inch air condenser together with 60 grams of m,p-cresol. The reactants are rapidly heated to 120° C., then to 250° C. at a rate of about 20° C. per hour. Heating at 250° C. is continued until a thread-forming stage is reached. The product is diluted with 142.5 grams of m,p-cresol and saved for further reaction hereinbelow.

PART B.—POLYESTER COMPONENT

|  | Grams | Moles | Equivalent Percent |
|---|---|---|---|
| (1) Dimethylterephthalate | 103.5 | 0.533 | 11.60 |
| Glycerol | 49.2 | 0.533 | 17.38 |
| (2) Dimethylterephthalate | 129.1 | 0.666 | 14.50 |
| Ethylene glycol | 62.1 | 1.0 | 21.74 |

The ingredients outlined in Part B (1) are charged into a three-neck flask equipped with stirrer, thermometer, nitrogen sparge tube and condensate trap together with 1.0 grams of titanium acetylacetonate and 14.0 grams of m,p-cresol. These ingredients are heated rapidly to 180° C., then to 215° C. at a rate of about 10° C. per hour. The charge is held at 215° C. until a thread-forming stage (90° C. Ball and Ring Temperature) is reached. At this point, the ingredients outlined in Part B (2) hereinabove, together with 2.0 grams of titanium acetylacetonate are added and the reaction is continued by heating rapidly to 180° C., then heating to 250° C. at a rate of about 10° C. per hour until a second thread-forming stage is reached. At this point, the polyamide produced in Part A hereinabove is added and the reaction is continued at 217° C. to a third thread-forming stage. At this stage, 350 grams of m,p-cresol and 300 grams xylene are added. The diluted resinous product is then coated on No. 17 A.W.G. copper wire at a baking range of from 17 to 25 feet per minute. The cured resinous coating has fair thermal stability along with excellent heat shock and solvent resistance and good scrape hardness, abrasion resistance and flexibility.

Example V

PART A.—AMIDE COMPONENT

|  | Grams | Moles | Equivalent Percent |
|---|---|---|---|
| Isophthalic Acid | 133.0 | 0.8 | 17.39 |
| M-xylylenediamine | 108.9 | 0.8 | 17.39 |

PART B.—POLYESTER COMPONENT

|  | Grams | Moles | Equivalent Percent |
|---|---|---|---|
| (1) Dimethylterephthalate | 103.5 | 0.533 | 11.60 |
| Glycerol | 49.2 | 0.533 | 17.38 |
| (2) Dimethylterephthalate | 129.1 | 0.666 | 14.50 |
| Ethylene glycol | 62.1 | 1.0 | 21.74 |

The same procedure is employed in this example as that outlined in Example IV, hereinabove, except that an equimolar quantity of m-xylylenediamine is substituted for the ethylenediamine and the 1,4-butanediol of Part A, Example IV. The coating produced from this resin exhibits good heat shock and flexibility.

Example VI

PART A.—LINEAR POLYESTER COMPONENT

|  | Grams | Moles | Equivalent Percent |
|---|---|---|---|
| Dimethylterephthalate | 136.0 | 0.7 | 14.9 |
| Ethylene glycol | 65.1 | 1.05 | 22.3 |

The ingredients outlined hereinabove are charged into a 500 ml. 3-neck flask equipped with stirrer, thermometer, nitrogen sparge tube and a 6-inch air condenser together with 0.175 gram of lead acetate and 10.0 grams of m,p-cresol. The charge is rapidly heated to 180° C., then to 300° C. at a rate of about 20° C. per hour. The air condenser is removed to allow the condensate to escape more freely and the reaction is continued for 1 hour at 300° C. The resin product is poured into a tray, cooled and pulverized for use in Part B, below.

PART B.—CROSS-LINKED POLYESTER COMPONENT

|  | Grams | Moles | Equivalent Percent |
|---|---|---|---|
| Dimethylterephthalate | 136.0 | 0.7 | 14.9 |
| Glycerol | 64.5 | 0.7 | 22.5 |

PART C.—ACID-AMINE COMPONENT

|  | Grams | Moles | Equivalent Percent |
|---|---|---|---|
| Isophthalic Acid | 99.7 | 0.6 | 12.7 |
| M-phenylenediamine | 64.9 | 0.6 | 12.7 |

Together with 0.175 gram of lead acetate and 35 ml. of m,p-cresol, the ingredients outlined in Part B are charged into a one-liter, 3-neck flask equipped with stirrer, thermometer, nitrogen sparge tube and condensate trap. The charge is rapidly heated to 180° C., then to 225° C. at a rate of about 10° C. per hour. After one hour at this temperature the resin becomes thread-forming and reaches a ball and ring softening temperature of 85° C. Another 35 ml. of cresol are added and the reaction is continued at 215° C. for one hour at which point a second thread-forming stage is reached. At this point, the product of Part A and the ingredients outlined in Part C, together with 70 ml. of m,p-cresol are added. The charge is heated to a temperature of from 200° C. to 215° C. at a rate of 10° C. increase per hour to a third thread-forming stage. At this point, 103 grams of m,p-cresol are added and the reaction is continued at 213° C. to a fourth thread-forming stage. Another 103 grams of m,p-cresol is added and a fifth thread-forming stage is obtained at 203° C. The resinous solution is further diluted with 309 grams of m,p-cresol and 600 grams of xylene together with 7.4 grams of cobalt naphthenate (6% cobalt). This composition is employed to coat a 17 A.W.G. copper wire at a baking range of from 15 to 22 feet per minute. The resinous insulating coating so produced has very good repeated abrasion resistance, scrape hardness and heat shock resistance along with good flexibility and thermal stability.

*Example VII*

PART A.—LINEAR POLYESTER COMPONENT

|  | Grams | Moles | Equivalent Percent |
|---|---|---|---|
| Dimethylterephthalate | 136.0 | 0.7 | 14.73 |
| Ethylene glycol | 65.1 | 1.05 | 22.10 |

Together with 1.05 grams of isopropyl titanate catalyst, the ingredients outlined in Part A hereinabove and 10.0 grams of m,p-cresol are charged into a 500 ml. 3-neck flask equipped with stirrer, thermometer, nitrogen sparge tube and a 6-inch air condenser. The charge is rapidly heated to 180° C., then to 300° C. at a rate of about 20° C. per hour, at which time the air condenser is removed to allow the condensate to escape more freely. The reaction is continued for 1 hour at 300° C. The resin product is poured into a tray, cooled and pulverized for use as an ingredient below.

PART B.—POLYESTERAMIDE COMPONENT

|  | Grams | Moles | Equivalent Percent |
|---|---|---|---|
| Isophthalic Acid | 16.5 | 0.1 | 2.11 |
| 1,4-butanediol | 2.2 | 0.025 | 0.53 |
| Ethylenediamine | 4.5 | 0.075 | 1.57 |

Together with 7.5 grams of m,p-cresol, the ingredients outlined in Part B are charged into a 500 ml., 3-neck flask, equipped with stirrer, thermometer, nitrogen sparge tube and a 6-inch air condenser. The reactants are rapidly heated to 120° C., then heated to 250° C. at a rate of 20° C. per hour. Heating is continued at 250° C. until a thread-forming stage is reached. This resinous product is poured into a tray, cooled, crushed and used as an ingredient in a reaction outlined hereinbelow.

PART C.—CROSS-LINKED POLYESTER COMPONENT

|  | Grams | Moles | Equivalent Percent |
|---|---|---|---|
| Dimethylterephthalate | 155.5 | 0.8 | 16.85 |
| Glycerol | 73.6 | 0.8 | 25.25 |

PART D.—ACID-AMINE COMPONENT

|  |  |  |  |
|---|---|---|---|
| Isophthalic Acid | 66.5 | 0.4 | 8.43 |
| M-phenylenediamine | 43.2 | 0.4 | 8.43 |

Together with 1.20 grams of isopropyl titanate and 40 ml. of m,p-cresol the ingredients outlined in Part C are charged into a one-liter, 3-neck flask equipped with stirrer, thermometer, nitrogen sparge tube and condensate trap. The charge is rapidly heated to 180° C., then to 225° C. at a rate of about 10° C. per hour. After one hour at this temperature the resin becomes thread-forming and reaches a ball and ring softening temperature of 85° C. Another 40 ml. of m,p-cresol are added and the reaction is continued at 215° C. for one hour at which point a second thread-forming stage is reached. At this point, the resin products of Part A and Part B, the ingredients outlined in Part D hereinabove and 100 ml. of m,p-cresol are added to the vessel. The charge is heated at a temperature of 200 to 208° C. for one hour to a third thread-forming stage whereupon an additional 100 ml. of m,p-cresol are added. The reaction is continued for an additional 20 minutes at 195° C. to a fourth thread-forming stage. The solution is then diluted with 400 ml. of m,p-cresol and 500 ml. of xylene, together with 7.4 grams of cobalt naphthenate (6% cobalt) as a catalyst. The resinous product is diluted to coating viscosity with a solvent made up of 3 volumes of xylene to 1 volume of m,p-cresol and coated on a No. 17 A.W.G. wire. The resinous wire insulation obtained shows a good combination of repeated abrasion resistance and scrape hardness along with excellent thermal stability.

*Example VIII*

PART A.—CROSS-LINKED POLYESTER

|  | Grams | Moles | Equivalent Percent |
|---|---|---|---|
| Dimethylterephthalate | 165.0 | 0.85 | 18.30 |
| Glycerol | 78.2 | 0.85 | 27.50 |

Together with 0.213 gram of lead acetate and 42 ml. of m,p-cresol, the ingredients outlined in Part A are charged into a 500 ml., 3-neck flask equipped with a stirrer, thermometer, nitrogen sparge tube and 6-inch air condenser. The charge is rapidly heated to 180° C., then from 180° C. to 215° C. at a rate of about a 10° C. increase per hour. After two hours at 215° C., the resin becomes viscous and thread-forming (85° C. Ball and Ring Softening temperature). After 42 ml. of m,p-cresol are added, the reaction is continued at 215° C. for one hour to a second thread-forming stage (67.5° C. Ball and Ring temperature). The resin is diluted with 84 ml. of m,p-cresol for use as an ingredient in the reaction described below.

PART B.—LINEAR POLYESTER

|  | Grams | Moles | Equivalent Percent |
|---|---|---|---|
| Dimethylterephthalate | 198.2 | 1.02 | 21.90 |
| Ethylene glycol | 74.5 | 1.20 | 25.80 |

Together with 0.25 gram of lead acetate and 5.0 ml. of m,p-cresol, the ingredients outlined in Part B are charged into a 500 ml., 3-neck flask equipped with a stirrer, thermometer, nitrogen sparge tube and 6-inch air condenser. The charge is rapidly heated to 180° C., then to 300° C. at a rate of 10 to 15° C. per hour. The air condenser is removed and the reaction is continued for one hour at 300° C. The resinous polymer product is poured into an open pan and cooled. After cooling, it is removed from the pan and crushed for reaction in Part C, as outlined.

PART C.—ACID-AMINE COMPONENT

|  | Grams | Moles | Equivalent Percent |
|---|---|---|---|
| Isophthalic Acid | 24.9 | 0.15 | 3.25 |
| M-phenylenediamine | 16.2 | 0.15 | 3.25 |

The resinous products of Part A and Part B together with the ingredients outlined in Part C and 100 ml. of m,p-cresol are charged into a two-liter, 3-neck flask equipped with stirrer, thermometer, sparge tube and condensate trap. This charge is rapidly heated to 200° C., the reaction being continued at a temperature between 200° C. and 220° C. until the resin becomes viscous and thread-forming. After the addition of 100 ml. of m,p-cresol, the reaction is continued at 215° C. until the resin reaches a second viscous and thread-forming stage. An additional 100 ml. of m,p-cresol is added, the charge being reacted at 213° C. to a third viscous and thread-forming stage. At this point, 100 ml. of m,p-cresol and 74.0 grams of cobalt naphthenate (6% cobalt) in 100 ml. of m,p-cresol are added. This is reacted for 5 minutes at 185° C., the product being thinned with 200 ml. m,p-cresol, 700 ml. xylene. Two grams of 2,2'-methylene bis(4-methyl-6-tert-butylphenol), an anti-oxidant commercially available as American Cyanamid Anti-Oxidant No. 2246, are added. The composition is thinned to a suitable coating viscosity with a solvent made from 3 volumes of xylene to 1 volume of m,p-cresol and then coated on a No. 17 A.W.G. copper wire at a baking range of from 15 to 36 feet per minute. The coatings so produced have excellent flexibility, abrasion resistance, scrape hardness, heat shock resistance and thermal stability.

*Example IX*

PART A.—POLYESTER COMPONENT

|  | Grams | Moles | Equivalent Percent |
|---|---|---|---|
| Isophthalic Acid | 258.0 | 1.55 | 33.21 |
| Dimethylterephthalate | 58.2 | 0.30 | 6.42 |
| Glycerol | 92.0 | 1.0 | 32.10 |
| Ethylene glycol | 63.3 | 1.02 | 21.85 |

PART B.—ACID-AMINE COMPONENT

|  | Grams | Moles | Equivalent Percent |
|---|---|---|---|
| Isophthalic Acid | 24.9 | 0.15 | 3.21 |
| Ethylenediamine | 10.5 | 0.15 | 3.21 |

Together with 3.0 grams of isopropyl titanate and 20.0 ml. of m,p-cresol, the ingredients outlined in Part A are charged into a two-liter, 3-neck flask equipped with stirrer, thermometer, nitrogen sparge tube and hot water condenser. The charge is rapidly heated to 180° C., then to 240° C. at a rate increase of about 10° C. per hour. When a viscous and thread-forming stage, having a ball and ring softening temperature of 105° C. is attained, the ingredients outlined in Part B, together wtih 100 ml. of m,p-cresol are added to the vessel. The condenser is removed. The reaction is continued at a temperature of from 200° C. to 215° C. until a viscous and thread-forming stage having a ball and ring softening temperature of 75° C. is reached. At this point, an additional 100 ml. of m,p-cresol is added. The reaction is again continued at a temperature of about 215° C. until a viscous and thread-forming stage having a ball and ring softening temperature of 54° C. is reached. At this point, 100 ml. of a thinner grade of cresylic acid, 55.5 grams of cobalt naphthenate (6% cobalt) and 23.1 grams of zinc naphthenate (14.5% zinc) are added. The reaction is continued for an additional 5 minutes at 190° C. The resinous product is thinned to a suitable coating viscosity with a solvent made from 2 parts of Solvesso 100, a proprietary mixed aromatic hydrocarbon solvent having a boiling range of 154° C.–177° C., to 1 volume of cresylic acid.

This composition is then employed to coat a Number 17 A.W.G. copper wire at a baking range of 17 to 32 feet per minute. The baking range of the resinous composition is excellent. Tests conducted on the resinous coating disclose that it has the properties of excellent flexibility, scrape hardness and heat shock along with good abrasion resistance and thermal stability.

*Example X*

PART A.—LINEAR POLYESTER COMPONENT

|  | Grams | Moles | Equivalent Percent |
|---|---|---|---|
| Isophthalic Acid | 141.2 | 0.85 | 18.20 |
| Ethylene glycol | 63.3 | 1.02 | 21.86 |

Together with 5.0 ml. m,p-cresol, the ingredients enumerated in Part A are charged into a one-liter, 3-neck flask equipped with a stirrer, thermometer, nitrogen sparge tube and air condenser. The charge is rapidly heated to about 170° C., then to 300° C. at a rate of about 15° C. per hour. At 300° C., the air condenser is removed and the reaction is continued for one hour. At this point, the resinous product is poured from the reaction flask into a cooling tray. After cooling, the material is removed from the tray, crushed and held for reaction as outlined below.

PART B.—CROSS-LINKED POLYESTER COMPONENT

|  | Grams | Moles | Equivalent Percent |
|---|---|---|---|
| Isophthalic Acid | 166.1 | 1.0 | 21.41 |
| Glycerol | 92.1 | 1.0 | 32.11 |

PART C.—ACID-AMINE COMPONENT

|  | Grams | Moles | Equivalent Percent |
|---|---|---|---|
| Isophthalic Acid | 24.9 | 0.15 | 3.21 |
| M-phenylenediamine | 16.2 | 0.15 | 3.21 |

Together with 50 ml. m,p-cresol, the ingredients outlined in Part B are charged into a two-liter, 3-neck flask equipped with stirrer, thermometer and nitrogen sparge tube. The charge is rapidly heated to about 160° C., then to 210° C. at a temperature increase of about 10° C. per hour. Heating is continued until the charge reaches a thread-forming stage. An additional 50 ml. of m,p-cresol is added. The reaction is continued to a second thread-forming stage. The charge is again diluted with 200 ml. of m,p-cresol. The resinous product of Part A and the ingredients outlined in Part C are added to the flask. The reaction is continued at 210° C. to a third thread-forming stages, then to fourth and fifth thread-forming stages with 100 ml. m,p-cresol additions after each thread-forming stage. A solution containing 74.0 grams of cobalt naphthenate (6% cobalt) dissolved in 100 ml. m,p-cresol is added. The reaction is continued for 5 minutes at 185° C. The solution is diluted with 200 ml. m,p-cresol and 700 ml. of Solvesso 100 and 2.0 grams of 2,2'-methylenebis (4-methyl-6-tert-butyl-phenol). The resinous product is dip-coated on No. 17 A.W.G. copper wire after thinning to the proper viscosity with a solvent made from 1 part of m,p-cresol by volume to 2 parts of Solvesso 100 by volume. A baking range of from 17 to 32 feet per minute may be employed. The resinous wire coating exhibits excellent flexibility, scrape hardness, repeated abrasion and heat shock.

*Example XI*

PART A.—POLYESTER COMPONENT

|  | Grams | Moles | Equivalent Percent |
|---|---|---|---|
| Isophthalic Acid | 307.5 | 1.85 | 39.60 |
| Glycerol | 92.1 | 1.0 | 32.11 |
| Ethylene glycol | 63.4 | 1.02 | 21.88 |

11

PART B.—ACID-AMINE COMPONENT

|  | Grams | Moles | Equivalent Percent |
|---|---|---|---|
| Isophthalic Acid | 24.9 | 0.15 | 3.20 |
| M-phenylenediamine | 16.2 | 0.15 | 3.21 |

Together with 20 ml. of m,p-cresol, the ingredients outlined in Part A are charged into a 2-liter, 3-neck flask equipped with stirrer, thermometer, nitrogen sparge tube and condensate trap. The charge is rapidly heated to 180° C., then to 240° C. at a temperature increase of about 10° C. per hour. The reaction is continued at 240° C. until the resin becomes viscous and thread-forming. At this point, the ingredients outlined in Part B, together with 100 ml. of m,p-cresol are added to the vessel. The charge is heated to 200° C., then to 220° C. at a temperature increase of about 10° C. per hour. Heating is continued until the resin becomes viscous and thread-forming. After an addition of 100 ml. of m,p-cresol, the reaction is carried to a third viscous and thread-forming stage. At this point, 100 ml. of cresylic acid and 74.0 grams of cobalt naphthenate (6% cobalt) are added. This is reacted for 5 minutes at 185° C. Then, 400 ml. of cresylic acid, 700 ml. of Solvesso 100 and 2 grams of 2,2'-methylenebis (4-methyl-6-tert-butyl-phenol) are added. The resinous product is further thinned to coating viscosity with a solvent made up of equal volumes of cresylic acid and Solvesso 100. This composition is coated on a No. 17 A.W.G. copper wire. Good flexibility, heat shock and thermal stability along with excellent scrape hardness and repeated abrasion properties are obtained with this composition over a wide range of baking conditions.

Example XII

PART A.—POLYESTER COMPONENT

|  | Grams | Moles | Equivalent Percent |
|---|---|---|---|
| Dimethylterephthalate | 359.0 | 1.85 | 40.57 |
| Glycerol | 59.8 | 0.65 | 21.35 |
| Ethylene glycol | 89.5 | 1.44 | 31.52 |

PART B.—AMINE-ACID COMPONENT

|  | Grams | Moles | Equivalent Percent |
|---|---|---|---|
| Isophthalic Acid | 24.9 | 0.15 | 3.28 |
| Methylenedianiline | 14.9 | 0.075 | 1.64 |
| M-phenylenediamine | 8.1 | 0.075 | 1.64 |

Together wtih 4.7 grams of zinc naphthenate (14.5% zinc) and 10.3 grams of m,p-cresol, the ingredients outlined in Part A are added to a 2-liter flask equipped with a stirrer, nitrogen sparge tube and a steam condenser. The charge is rapidly heated to 180° C., then to 255° C. at an increase of about 15° C. per hour. Heating is continued to a viscous and thread-forming stage having a ball and ring softening temperature of 114° C. At this point, the ingredients outlined in Part B, together with 103.0 grams of m,p-cresol are added to the flask and the reaction is continued at 200 to 225° C. until a second viscous and thread-forming stage having a ball and ring softening temperature of 89° C. is reached. Another 103 grams of m,p-cresol are added and the reaction is continued at 215° C. to another viscous and thread-forming stage which has a ball and ring softening temperature of 65° C. At this point 103 grams of cresylic acid and 74.0 grams of cobalt naphthenate (6% cobalt) dissolved in 103 grams of cresylic acid are added. The reaction is continued at 185° C. for 5 minutes. The resinous composition is further diluted with 258 grams of cresylic acid and 392 grams of Solvesso 100 together with an addition of 2.0 grams of 2,2'-methylenebis (4-methyl-6-tert-butyl-phenol).

A solution of 50.0 grams of the blocked cyclic trimer of tolylene diisocyanate dissolved in 180 grams of cresylic acid is blended with the foregoing resinous polyesteramide product. The blended solution is further diluted to coating viscosity with a solvent made from 3 parts of Solvesso 100 to 1 part cresylic acid, by volume, and dip-coated on a No. 17 A.W.G. copper wire. Tests on the wire coating show very good flexibility, scrape hardness, abrasion resistance, heat shock resistance and thermal stability.

Example XIII

PART A.—POLYESTERAMIDE COMPONENT

|  | Grams | Moles | Equivalent Percent |
|---|---|---|---|
| (1) Polyester: |  |  |  |
| Dimethylterephthalate | 330.0 | 1.7 | 35.0 |
| Glycerol | 156.5 | 1.7 | 52.6 |
| (2) Amine-Acid: |  |  |  |
| Isophthalic Acid | 49.8 | 0.30 | 6.2 |
| Ethylenediamine | 20.9 | 0.30 | 6.2 |

Together with 4.7 grams of zinc naphthenate (14.5% zinc) and 85.0 grams of m,p-cresol, the ingredients outlined in Part A (1) are charged into a 2-liter, 3-neck flask equipped with stirrer, thermometer, nitrogen sparge tube and condensate trap. The charge is heated to a temperature of from 180 to 220° C. at an increase of 10° C. per hour. Heating is continued until a viscous thread-forming stage is reached. At this point, the ingredients outlined in Part A (2) together with 100 grams of m,p-cresol are added and the reaction is continued at a temperature of from 180° C. to 220° C., the charge being heated at a rate of about 10° C. increase per hour, until a second thread-forming stage is reached. Again, 100.0 grams of m,p-cresol are added and the reaction is continued at 215° C. until a third-thread-forming stage is reached. The product is thinned with 500 grams of cresylic acid and 630.0 grams of Solvesso 100, together with an addition of 2.0 grams of 2,2'-methylenebis (4-methyl-6-tert-butyl-phenol). This composition is employed as a component in the blend outlined hereinbelow.

PART B.—POLYESTER COMPONENT

|  | Grams | Moles | Equivalent Percent |
|---|---|---|---|
| Dimethylterephthalate | 388.2 | 2.0 | 43.2 |
| Glycerol | 74.4 | 0.8 | 25.8 |
| Ethylene glycol | 89.5 | 1.44 | 31.0 |

Together with 4.7 grams of zinc naphthenate (14.5% zinc) and 103.0 grams of m,p-cresol, the ingredients outlined in Part B are charged into a 2-liter, 3-neck flask equipped with stirrer, thermometer, nitrogen sparge tube and condensate trap. The charge is heated to a temperature of 180° C. to 240° C. at a temperature increase of about 15° C. per hour until a first thread-forming stage is reached. At this point 103.0 grams of m,p-cresol are added and the charge is heated until a second thread-forming stage is reached. After the addition of 103.0 grams of m,p-cresol and 61.4 grams of zinc naphthenate (14.5% zinc) dissolved in 103.0 grams of m,p-cresol, the reaction is continued for 5 minutes at 200° C. The resulting composition is further thinned with 515.0 grams of cresylic acid and 630.0 grams of Solvesso 100, with an addition of 2.0 grams of 2,2'-methylenebis (4-methyl-6-tert-butyl-phenol).

The resinous products of Parts A and B, as outlined, are blended together, thinned to a coating viscosity with a solvent made from 1 part of cresylic acid, by volume, to 2 parts of Solvesso 100, by volume, and coated on No. 17 A.W.G. copper wire. This composition has a good baking range and tests on coatings produced therewith illustrate good flexibility and excellent abrasion resistance, heat shock resistance and thermal stability.

Example XIV

PART A.—POLYESTER COMPONENT

|  | Grams | Moles | Equivalent Percent |
|---|---|---|---|
| Dimethylterephthalate | 58.2 | 0.3 | 6.0 |
| Isophthalic Acid | 282.0 | 1.7 | 34.0 |
| Glycerol | 184.2 | 2.0 | 60.0 |

Together with 3.0 grams of isopropyl titanate and 103.0 grams of m,p-cresol, the ingredients outlined in Part A are charged into a 2-liter, 3-neck flask equipped with stirrer, thermometer, nitrogen sparge tube and condensate trap. The charge is rapidly heated to 170° C., then to 210° C. at an increase of about 10° C. per hour. The charge is held at 210° C. through 3 thread-forming stages, 103.0 grams of m,p-cresol being added after each thread-forming stage. After the third thread-forming stage is reached, 30.8 grams of zinc naphthenate (14.5% zinc) dissolved in 103.0 grams of m,p-cresol are added and the reaction is continued for 5 minutes at 200° C. The product is further diluted by an addition of 515.0 grams of cresylic acid, 519.0 grams of xylene and 2.0 grams of 2,2'-methylenebis (4-methyl - 6 - tert-butyl-phenol). This composition is employed as a component in the blend outlined below. It should be noted that the equivalent percentages recited above are based on the materials in Part A, Polyester Component, above.

PART B.—POLYESTERAMIDE COMPONENT

|  | Grams | Moles | Equivalent Percent |
|---|---|---|---|
| (1) Polyester: | | | |
| Dimethylterephthalate | 87.2 | 0.45 | 6.4 |
| Isophthalic Acid | 387.0 | 2.32 | 33.2 |
| Glycerol | 138.1 | 1.50 | 32.2 |
| Ethylene glycol | 95.0 | 1.53 | 21.8 |
| (2) Amine-Acid: | | | |
| Isophthtalic Acid | 37.4 | 0.225 | 3.2 |
| Ethylenediamine (86%) | 15.7 | 0.225 | 3.2 |

Together with 4.5 grams of isopropyl titanate and 30.9 grams of m,p-cresol, the ingredients outlined in Part B (1) are charged into a 3-liter, 3-neck flask equipped with stirrer, thermometer, nitrogen sparge tube and condensate trap. The charge is rapidly heated 180° C., then to 240° C. at an increase of about 15° C. per hour. Heating is continued until a first viscous and thread-forming stage having a ball and ring softening temperature of 105° C. is reached. At this point, the ingredients outlined in Part B (2) together with 154.5 grams of m,p-cresol are added to the flask and the reaction is continued at a temperature of about 200° C. until a viscous and thread-forming stage having a ball and ring softening temperature of 74° C. is reached. Now, 154.5 grams of m,p-cresol are added and the reaction is continued until a third viscous and thread-forming stage having a ball and ring softening temperature of 54° C. is reached. At this point, 154.5 grams of m,p-cresol, 83.1 grams of cobalt naphthenate (6% cobalt) and 34.6 grams of zinc naphthenate (14.5% zinc) are added and the reaction is continued for 5 minutes at 190° C. The resin is diluted by the addition of 619.0 grams of cresylic acid and 945.0 grams of Solvesso 100, with an addition of 3.0 grams of 2,2' - methylenebis (4-methyl-6-tert-butyl-phenol). It should be noted that the equivalent percentages of the reactants employed in the preparation of the Polyesteramide Component are based on those reactants alone and do not include the reactants in Part A, above.

The resinous products produced in Parts A and B, as outlined, are blended together and thinned to a coating viscosity with a solvent made from 2 parts of Solvesso 100, by volume, to 1 part of cresylic acid, by volume, and coated on No. 17 A.W.G. copper wire. This blend has a good baking range and tests on coatings produced therewith exhibit good flexibility and excellent abrasion resistance.

As noted hereinbefore, the polyesteramide resin which is employed in the liquid coating composition may be a homopolymer, a block copolymer of a plurality of polyesters having different functionality with polyamides or a modified block copolymer. As will be apparent to those skilled in the art, the specific molecular structure of the polyesteramide resin will be determined by the particular reaction method employed.

In preparing the homopolymer, for example, all of the unpolymerized ingredients in the proportions outlined hereinbefore, are charged into a single flask and reacted together to a high molecular weight. The resulting polyesteramide resin is then thinned to a suitable coating viscosity by means of an appropriate solvent-diluent system. The liquid coating composition is then applied to an article, as for example, an electrical conductor. The applied coating is heated and thus reacted or cured to an even higher molecular weight, whereby a solid resinous coating is produced.

The polyesteramide block copolymer, employed in the liquid coating composition, is produced by coreacting polymers, as distinguished from recating the unpolymerized ingredients together, in a single vessel. For example, we may prepare glyceryl terephthalate by reacting together only glycerol and dimethyl terephthalate. Similarly, ethylene glycol terephthalate is prepared by reacting together only ethylene glycol and dimethyl terephthalate; ethylene isophthalamide is prepared by reacting together only ethylene diamine and isophthalic acid. The individual polymers: glyceryl terephthalate, ethylene glycol terephthalate and ethylene isophthalamide are then charged into one flask and coreacted to a high molecular weight polyesteramide. After application as a coating, the block copolymer is coated on an article and further reacted to an even higher molecular weight, as was the polyesteramide described above.

A modified-block copolymeric polyesteramide is produced by reacting at least one polymer with additional unpolymerized ingredients until a high molecular weight is attained. For example, glyceryl terephthalate is first produced by reacting together glycerol and dimethyl terephthalate. Ethylene glycol and dimethyl terephthalate are added to the glyceryl terephthalate and reacted together. Then, ethylenediamine and isophthalic acid are added to the reaction product, the reaction being continued until a high molecular weight polyesteramide is produced. In yet another variation, ethylenediamine and isophthalic acid may be reacted together with the polymers glyceryl terephthalate and ethylene glycol terephthalate. Application as a coating and further polymerization to a higher molecular weight is conducted as described above.

Suitable polyesteramide, according to this invention, may be prepared by any of these methods so long as the proportion of the ingredients is maintained within the equivalent percentages outlined heretofore. It will be apparent from the description hereinabove and hereinafter that the polyesteramide may be blended with certain polyesters or the cyclic trimer of tolylene diisocyanate to provide yet another liquid coating composition.

The polyesteramide may be cold blended with up to 20%, on a solid basis, of the cyclic trimer of tolylene diisocyanate.

Satisfactory compositions may also be prepared by blending from 10 to 90 percent, by weight, of the described polyesteramide coating composition with from 10 to 90 percent, by weight, of a polyester composition prepared from:

(a) from 40 to 46 equivalent percent of at least one acidic compound selected from the group consisting of isophthalic acid and the lower dialkylesters of isophthalic and terephthalic acids, (b) from 14 to 60 equivalent percent of at least one alcohol having three or more hydroxyl groups, and (c) up to 46 equivalent percent of at least one dihydric alcohol.

While the heretofore recited blend proportions of polyesteramide and polyester produce insulating coatings with improved properties, the most beneficial results attend blends of 40 to 60 percent, by weight, of the polyesteramide with 40 to 60 percent, by weight, of the polyester.

It is to be understood that any suitable solvent-diluent system may be employed to thin the resinous polymeric polyesteramide reaction products, and blends therewith, to a suitable wire coating viscosity. Suitable solvents include, for example, cresol, cresylic acid, phenol, phenol derivatives such as amylphenol and parachlorophenol and mixtures thereof. Suitable diluents include aromatic hydrocarbons having a boiling range within the range of from 130° C. to 300° C. At least one solvent is employed with at least one diluent in a manner known in the art for polyester wire enamels.

In accordance with another aspect of this invention, we have discovered that the polyesteramide coated electrical conductors described hereinabove can be overcoated with a linear terephthalate polyester, an aromatic imide, an aromatic amide-imide, or a urea-formaldehyde modified epoxy to further improve flexibility, heat shock resistance, repeated abrasion resistance, thermal stability, hydrolytic stability or electrical strength.

The following examples will serve to illustrate the overcoated polyesteramide insulated electrical conductors:

*Example XV*

The polyesteramide is first applied to the electrical conductor so that it comprises 75 to 90% of the ultimate resinous insulation, based on the increase in diameter of the coated conductor. The polyesteramide may be applied employing compositions and methods outlined in Examples I through XIV. The overcoat is applied advantageously in the same operation. In this operation, the polyesteramide is die-coated in four passes followed by a two pass die-coating of the overcoat enamel. The overcoat is cured in an oven having a temperature range of from 360° C. to 430° C. A baking range of between 19 and 32 feet per minute may be employed to cure the overcoat. The liquid overcoat composition was a 17% by weight solution of a linear, high molecular weight polyethylene terephthalate, known in the art as Dacron, in a solvent consisting of about 30 to 40% phenol, 20 to 40% o-cresol and about 20 to 40% p-chlorophenol, by weight.

The combination of these two coatings results in a combination conductor coating having improved repeated scrape abrasion resistance, flexibility and heat shock resistance as compared to the base polyesteramide coating itself. No sacrifice in the properties of the polyesteramide coating is experienced.

An aromatic polyimide or an aromatic polyamide-imide coating may be advantageously applied over the polyesteramide coating. An aromatic polyimide is commercially available as Du Pont's "ML" resin. A suitable aromatic polyamide-imide is described in U.S. application Ser. No. 2,029, assigned to the assignee of this invention. A satisfactory aromatic polyamide-imide, for example, is a resinous product having the general formula:

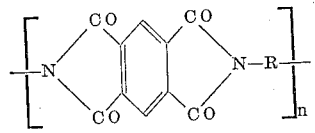

in which $n$ is an integer from 1 to about 100 and R represents the divalent radical consisting of:

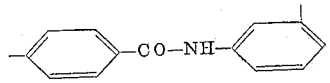

Both the polyimide and the polyamide-imide overcoatings produce combination coatings with the advantages of improved heat shock, flexibility and thermal stability.

A urea-formaldehyde modified epoxy may also be employed as an overcoat over an initial coating of the polyesteramide resin. This system results in improved heat shock resistance and electric strength.

The resinous coating compositions disclosed herein may be applied to electrical conductors composed of metals such as copper, silver, steel, aluminum or the like. Referring to FIG. 1 of the drawing, there is illustrated a conductor 10 comprising a copper conductor 11 coated with a hard, tough, solid resinous polyesteramide film 12 applied to and cured on the conductor as described heretofore. It will be understood that the coating may be applied by any suitable means such, for example, as by dipping, die-coating, or the like. After curing, it will be found that the resinous film 12 is tenaciously adhered to the conductor 11. While the conductor 11 is illustrated as being of circular shape, it will be understood that it may be of any other desirable shape, such as square, rectangular or flat strip, or it may be composed of twisted or braided wire or the like. The polyesteramide composition may have disposed therein suitable fillers, such as finely divided mica, silica and iron oxide. Coloring materials or the like may also be disposed in the composition.

Figure 2:
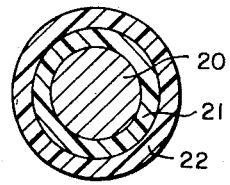
FIG. 2 is a cross-sectional view of a conductor insulated with a solid resinous polyesteramide polymer and with a second resinous coating deposited thereover.

The polyesteramide composition of this invention may be applied to electrical conductors such as wire, in combination with the various organic resinous coating materials described heretofore, deposited thereover. One form of this modification of the invention is illustrated in FIG. 2 of the drawing showing an electrical conductor 20 of copper, for example, first insulated with a film of the polyesteramide 21 and a resinous film overcoat 22 deposited thereover which may, for example, be the described linear polyethylene terephthalate composition.

Figure 3:
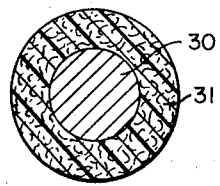
FIG. 3 is a cross-sectional view of a conductor insulated with a fibrous material and an enamel of this invention.

The polyesteramide composition of this invention may the applied to electrical conductors such as wire, in combination with coatings of both organic and inorganic fibrous materials. One form of this modification of the invention is illustrated in FIG. 3 of the drawing showing an electrical conductor 30 of copper, for example, carrying a layer 31 of fibrous material which may be glass fibers, asbestos fibers, paper, cotton or silk or the like, either wrapped or braided or woven or various combinations thereof. The fibrous layer 31 ordinarily will be applied to the conductor 30 and the resinous polyesteramide liquid compositions of this invention applied over the fibrous layer by dipping, die-coating or the like until the fibrous material is saturated and the coatings are then baked to cure the resin. It will be appreciated that the copper conductor may be pretreated with an adhesive composition in order to adhere the layer 31 thereto. Such adhesive compositions may comprise an initial tacky coating of the polyesteramide composition of this invention or other resinous compositions.

Since certain obvious changes may be made in the above procedure and different embodiments of the invention could be made without departing from the scope thereof, it is intended that all matter contained in the above description and drawings shall be taken in connection with the accompanying claims and not in a limiting sense.

We claim as our invention:

1. A solid resinous insulating coating comprising a polymer derived by heating a polyesteramide produced from the reaction of (a) from 40 to 46 equivalent percent of at least one acidic compound selected from the group consisting of isophthalic acid and the lower dialkyl esters of isophthalic and terephthalic acids with (b) from 13 to 59 equivalent percent of at least one alcohol having three or more hydroxyl groups, (c) up to 43 equivalent percent of at least one dihydric alcohol and (d) from 0.85 to 19 equivalent percent of at least one compound selected from the group consisting of urea and aliphatic and aromatic primary and secondary diamines.

2. A resinous insulating film comprising the polymer derived from the coreaction of (A) a polyesteramide derived from the reaction of (1) from 40 to 46 equivalent percent of at least one acidic material selected from the group consisting of isophthalic acid and the lower dialkyl esters of isophthalic and terephthalic acids with (2) from 13 to 59 equivalent percent of at least one alcohol having three or more hydroxyl groups, and (3) up to 43 equivalent percent of at least one dihydric alcohol, and (4) from 0.85 to 19 equivalent percent of a compound selected from the group consisting of urea and organic diamines, with up to 20%, by weight on a resin solids basis, of (B) the blocked cyclic trimer of tolylene diisocyanate.

3. A resinous insulating film derived from the coreaction of a blend of from 10 to 90 percent, by weight, of (A) a polyesteramide derived from the reaction of (1) from 40 to 46 equivalent percent of at least one dicarboxylic material selected from group consisting of isophthalic acid and the lower dialkyl esters of isophthalic and terephthalic acids, (2) from 13 to 59 equivalent percent of at least one alcohol having three or more hydroxy groups (3) up to 43 equivalent percent of at least one dihydric alcohol and (4) from 0.85 to 19 equivalent percent of at least one compound selected from the group consisting of urea and organic diamines and from 10 to 90 percent, by weight, of (B) a polyester derived from the reaction of (1) from 40 to 46 equivalent percent of at least one acidic compound selected from the group consisting of isophthalic acid and the 1 to 4 carbon atom dialkyl esters of isophthalic and terephthalic acids, (2) from 14 to 60 equivalent percent of at least one alcohol having three or more hydroxyl groups, and (3) up to 46 equivalent percent of at least one dihydric alcohol.

4. A resinous insulating film derived from the coreaction of a blend of from 40 to 60 percent, by weight, of (A) a polyesteramide derived from the reaction of (1) from 40 to 46 equivalent percent of at least one dicarboxylic material selected from the group consisting of isophthalic acid and the lower dialkyl esters of isophthalic and terephthalic acids, (2) from 13 to 59 equivalent percent of at least one alcohol having three or more hydroxy groups, (3) up to 43 equivalent percent of at least one dihydric alcohol and (4) from 0.85 to 19 equivalent percent of at least one compound selected from the group consisting of urea and organic diamines and 40 to 60 percent, by weight, of (B) a polyester derived from the reaction of (1) from 40 to 46 equivalent percent of at least one acidic compound selected from the group consisting of isophthalic acid and the 1 to 4 carbon atom dialkyl esters of isophthalic and terephthalic acids, (2) from 14 to 60 equivalent percent of at least one alcohol having three or more hydroxyl groups, and (3) up to 46 equivalent percent of at least one dihydric alcohol.

5. A resinous insulating film derived from the polymerization of a blend of (A) a polyesteramide derived from the reaction of (1) from 40 to 46 equivalent percent of a mixture of isophthalic acid and dimethylterephthalate, (2) from 13 to 59 equivalent percent of glycerol, (3) up to 43 equivalent percent of ethylene glycol and (4) from 0.85 to 19 equivalent percent of an organic diamine with (B) up to 20%, by weight on a resin solids basis, of the blocked trimer of tolylene diisocyanate.

6. A liquid resinous coating composition comprising (A) a polyesteramide derived from the reaction of (1) from 40 to 46 equivalent percent of at least one dicarboxylic material selected from the group consisting of isophthalic acid and the lower dialkyl esters of isophthalic and terephthalic acids, (2) from 13 to 59 equivalent percent of at least one alcohol having 3 or more hydroxy groups, (3) up to 43 equivalent percent of at least one dihydric alcohol and (4) from 0.85 to 19 equivalent percent of at least one compound selected from the group consisting of urea and organic diamines and (B) a suitable solvent-diluent to thin said polyesteramide.

7. A liquid resinous coating composition comprising (A) a polyesteramide derived from the reaction of (1) from 40 to 46 equivalent percent of at least one dicarboxylic material selected from the group consisting of isophthalic acid and the lower dialkyl esters of isophthalic and terephthalic acids, (2) from 13 to 59 equivalent percent of at least one alcohol having 3 or more hydroxy groups, (3) up to 43 equivalent percent of at least one dihydric alcohol and (4) from 0.85 to 19 equivalent percent of at least one compound selected from the group consisting of urea and organic diamines; and (B) at least one diluent selected from the group consisting of aromatic hydrocarbons having a boiling range within the range of 130° C. and at least one solvent selected from the group consisting of m,p-cresol, phenol, cresylic acid, parachlorophenol and amylphenol.

8. A liquid resinous coating composition comprising (A) a polyesteramide derived from the reaction of (1) from 40 to 46 equivalent percent of at least one dicarboxylic material selected from the group consisting of isophthalic acid and the lower dialkyl esters of isophthalic and terephthalic acids, (2) from 13 to 59 equivalent percent of at least one alcohol having 3 or more hydroxy groups, (3) up to 43 equivalent percent of at least one dihydric alcohol and (4) from 0.85 to 19 equivalent percent of at least one compound selected from the group consisting of urea and organic diamines; (B) a solvent-diluent system for thinning the polyesteramide comprising (1) at least one solvent selected from the group consisting of m,p-cresol, phenol, cresylic acid, parachlorophenol and amylphenol and (2) at least one diluent selected from the group of aromatic hydrocarbons having a boiling range within the range of 130° C. to 300° C.; and (C) from 0.1 to 5.0%, by weight of metal on a resin solids basis, of a metal catalyst in the form of a metal selected from the group consisting of nickel, zinc and cobalt in the form of a metal salt selected from the group consisting of naphthenates, octoates, acetylacetonates and tallates.

9. A liquid resinous coating composition comprising a blend of (A) a polyesteramide derived from the reaction of (1) from 40 to 46 equivalent percent of at least one dicarboxylic material selected from the group consisting of isophthalic acid and the lower dialkyl esters of isophthalic and terephthalic acids, (2) from 13 to 59 equivalent percent of at least one alcohol having 3 or more hydroxy groups, (3) up to 43 equivalent percent of at least one dihydric alcohol and (4) from 0.85 to 19 equivalent percent of at least one compound selected from the group consisting of urea and organic diamines (B) up to 20%, by weight on a resin solids basis, of the blocked trimer of tolylene diisocyanate; (C) a solvent-diluent system for thinning the polyesteramide comprising (1) at least one solvent selected from the group consisting of m,p-cresol, phenol, cresylic acid, parachlorophenol and amylphenol and (2) at least one diluent selected from the group of aromatic hydrocarbons having a boiling range within the range of 130° C. to 300° C.; and (D) from 0.1 to 5.0%, by weight of metal on a resin solids basis, of at least one metal selected from the group consisting of nickel, zinc and cobalt in the form of a metal salt selected from the group consisting of naphthenates, octoates, acetylacetonates and tallates.

10. A liquid resinous coating composition comprising a blend of from 10 to 90 percent, by weight, of (A) a polyesteramide derived from the reaction of (1) from 40 to 46 equivalent percent of at least one dicarboxylic material selected from the group consisting of isophthalic acid and the lower dialkyl esters of isophthalic and terephthalic acids, (2) from 13 to 59 equivalent percent of at least one alcohol having 3 or more hydroxy groups, (3) up to 43 equivalent percent of at least one dihydric alcohol and (4) from 0.85 to 19 equivalent percent of at least one compound selected from the group consisting of urea and organic diamines, with from 10 to 90%, by weight, of (B) a polyester derived from the reaction of (1) from 40 to 46 equivalent percent of at least one dicarboxylic material selected from the group consisting of isophthalic acid and the lower dialkyl esters and terephthalic acids, (2) from 14 to 60 equivalent percent of at least one alcohol having 3 or more hydroxyl groups, and (3) up to 46 equivalent percent of at least one dihydric alcohol and from 0.1 to 5%, by weight of metal based on the weight of the resin solids, of (C) at least one metal selected from the group consisting of nickel, cobalt and zinc in the form of a metal salt selected from the group consisting of naphthenates, octoates, acetylacetonates and tallates, and (D) a solvent-diluent system for thinning the blend.

11. A liquid resinous coating composition comprising a blend of from 40 to 60 percent, by weight, of (A) a polyesteramide derived from the reaction of (1) from 40 to 46 equivalent percent of at least one dicarboxylic material selected from the group consisting of isophthalic acid and the lower dialkyl esters of isophthalic and terephthalic acids, (2) from 13 to 59 equivalent percent of at least one alcohol having 3 or more hydroxy groups, (3) up to 43 equivalent percent of at least one dihydric alcohol and (4) from 0.85 to 19 equivalent percent of at least one compound selected from the group consisting of urea and organic diamines, with from 40 to 60%, by weight, of (B) a polyester derived from the reaction of (1) from 40 to 46 equivalent percent of at least one dicarboxylic material selected from the group consisting of isophthalic acid and the lower dialkyl esters of isophthalic and terephthalic aicds, (2) from 14 to 60 equivalent percent of at least one alcohol having 3 or more hydroxyl groups, and (3) up to 46 equivalent percent of at least one dihydric alcohol and from 0.1 to 5%, by weight of metal based on the weight of the resin solids, of (C) at least one metal selected from the group consisting of nickel, cobalt and zinc in the form of a metal salt selected from the group consisting of naphthenates, octoates, acetylacetonates and tallates, and (D) a solvent-diluent system for thinning the blend.

12. A composite resinous film comprising, in combination, a first layer comprising the heat reaction product of a polyesteramide derived from the reaction of (1) from 40 to 46 equivalent percent of at least one dicarboxylic material selected from the group consisting of isophthalic acid and the lower dialkyl esters of isophthalic and terephthalic acids, (2) from 13 to 59 equivalent percent of at least one alcohol having 3 or more hydroxy groups, (3) up to 43 equivalent percent of at least one dihydric alcohol and (4) from 0.85 to 19 equivalent percent of at least one compound selected from the group consisting of urea and organic diamines and a second layer, deposited over the first layer comprising a resinous polymeric product selected from the group consisting of linear polyethyleneterephthalate, aromatic polyimide, aromatic polyamide-imide and urea-formaldehyde modified epoxy.

13. An insulated electrical conductor comprising in combination, an electrical conductor and cured solid resinous insulation applied to the conductor, the resinous insulation comprising the heat reaction product of a polyesteramide derived from the reaction of (1) from 40 to 46 equivalent percent of at least one dicarboxylic material selected from the group consisting of isophthalic acid and the lower dialkyl esters of isophthalic and terephthalic acids, (2) from 13 to 59 equivalent percent of at least one alcohol having three or more hydroxy groups, (3) up to 43 equivalent percent of at least one dihydric alcohol and (4) from 0.85 to 19 equivalent percent of at least one compound selected from the group consisting of urea and organic diamines.

14. An insulated electrical member comprising, in combination, an electrical conductor and cured solid resinous insulation applied to the conductor, the resinous insulation comprising the copolymer of (A) a polyesteramide derived from the reaction of (1) from 40 to 46 equivalent percent of at least one dicarboxylic material selected from the group consisting of isophthalic acid and the lower dialkyl esters of isophthalic and terephthalic acids, (2) from 13 to 59 equivalent percent of at least one alcohol having three or more hydroxy groups, (3) up to 43 equivalent percent of at least one dihydric alcohol and (4) from 0.85 to 19 equivalent percent of at least one compound selected from the group consisting of urea and organic diamines, and (B) up to 20%, by weight on a solids basis of the blocked trimer of tolylene diisocyanate.

15. An insulated electrical member comprising, in combination, an electrical conductor and cured solid resinous insulation applied to the conductor, the resinous insulation comprising the copolymer derived from the coreaction of from 10 to 90 percent, by weight, of (A) a polyesteramide derived from the reaction of (1) from 40 to 46 equivalent percent of at least one dicarboxylic material selected from the group consisting of isophthalic acid and the lower dialkyl esters of isophthalic and terephthalic acids, (2) from 13 to 59 equivalent percent of at least one alcohol having three or more hydroxy groups, (3) up to 43 equivalent percent of at least one dihydric alcohol and (4) from 0.85 to 19 equivalent percent of at least one compound selected from the group consisting of urea and organic diamines and from 10 to 90 percent, by weight, of (B) a polyester derived from the reaction of (1) from 40 to 46 equivalent percent of at least one acidic compound selected from the group consisting of isophthalic acid and the 1 to 4 carbon atom dialkyl esters of isophthalic and terephthalic acids, (2) from 14 to 60 equivalent percent of at least one alcohol having three or more hydroxyl groups, and (3) up to 46 equivalent percent of at least one dihydric alcohol.

16. An insulated electrical member comprising, in combination, an electrical conductor and cured solid resinous insulation applied to the conductor, the resinous insulation comprising the copolymer derived from the coreaction of from 40 to 60 percent, by weight, of (A) a polyesteramide derived from the reaction of (1) from 40 to 46 equivalent percent of at least one dicarboxylic material selected from the group consisting of isophthalic acids and the lower dialkyl esters of isophthalic and terephthalic acids, (2) form 13 to 59 equivalent percent of at least one alcohol having three or more hydroxy groups, (3) up to 43 equivalent percent of at least one dihydric alcohol and (4) from 0.85 to 19 equivalent percent of at least one compound selected from the group consisting of urea and organic diamines and from 40 to 60 percent, by weight, of (B) a polyester derived from the reaction of (1) from 40 to 46 equivalent percent of at least one acidic compound selected from the group consisting of isophthalic acid and the 1 to 4 carbon atom dialkyl esters of isophthalic and terephthalic acids, (2) from 14 to 60 equivalent percent of at least one alcohol having three or more hydroxyl groups, and (3) up to 46 equivalent percent of at least one dihydric alcohol.

17. An insulated conductor comprising, in combination, an electrical conductor and a composite cured solid resinous insulation applied to the conductor, the composite resinous insulation comprising a first layer of the heat reaction product of a polyesteramide derived from the reaction of (1) from 40 to 46 equivalent percent of at least one dicarboxylic material selected from the group consisting of isophthalic acid, dimethylisophthalate and dimethylterephthalate, (2) from 13 to 59 equivalent percent of at least one alcohol having three or more hydroxy groups, (3) up to 43 equivalent percent of at least one dihydric alcohol and (4) from 0.85 to 19 equivalent percent of a compound selected from the group consisting of urea and organic diamines and a resinous second layer deposited over said first layer, selected from the group consisting of a linear polyethyleneterephthalate, aromatic polyimide, aromatic polyamide-imide and urea-formaldehyde modified epoxy.

(References on following page)

References Cited

UNITED STATES PATENTS

| | | | |
|---|---|---|---|
| 2,048,778 | 7/1936 | Brubaker et al. | 260—8 |
| 2,333,639 | 11/1943 | Christ et al. | 260—75 |
| 2,547,113 | 4/1951 | Drewitt et al. | 260—75 |
| 2,707,205 | 4/1955 | Abbott et al. | 174—120 |
| 2,759,991 | 8/1956 | Rheiner et al. | 174—120 |
| 2,936,296 | 5/1960 | Precopio et al. | 260—33.4 |
| 3,004,948 | 10/1961 | Rosenberg et al. | 260—33.4 |
| 3,008,914 | 11/1961 | Fry | 260—33.4 |
| 3,161,541 | 12/1965 | Holub | 117—232 |
| 3,201,276 | 8/1965 | Meyer et al. | 260—75 |
| 3,211,585 | 10/1965 | Meyer et al. | 260—75 |

OTHER REFERENCES

Donbron, Polyurethanes, p. 8 (1958).

MORRIS LIEBMAN, *Primary Examiner.*

JOHN P. WILDMAN, *Examiner.*

W. F. ZAGURSKI, A. H. KOECKERT, R. S. BARON,
*Assistant Examiners.*